H. O. SCHILLING.
FILLING MACHINE FOR DOUGHY AND POWDERY MATERIAL.
APPLICATION FILED JUNE 11, 1920.

1,394,582.

Patented Oct. 25, 1921.

Inventor:
Hugo. Otto Schilling
By Lawrence Langner
Attorney.

UNITED STATES PATENT OFFICE.

HUGO OTTO SCHILLING, OF HAMBURG, GERMANY, ASSIGNOR, BY MESNE ASSIGNMENTS, TO THE FIRM OF HANSA METALLWERK G. M. B. H., ABTEILUNG MASCHINENFABRIK, OF HAMBURG, GERMANY.

FILLING-MACHINE FOR DOUGHY AND POWDERY MATERIAL.

1,394,582.  Specification of Letters Patent.  Patented Oct. 25, 1921.

Application filed June 11, 1920. Serial No. 388,388.

*To all whom it may concern:*

Be it known that I, HUGO OTTO SCHILLING, a subject of Germany, residing at Hamburg, Germany, have invented certain new and useful Improvements in a Filling-Machine for Doughy and Powdery Material, of which the following is a specification.

This invention relates to a filling machine for powdery and doughy material, such as cream, dentrifices, paste, and the like, the object of the invention being to provide a machine of this description, by which the material can be separated into predetermined quantities and pressed into receptacles, such as tubes and the like. The machine comprises a cylindrical casing, a filling hopper and a rotatable and radially movable dividing-off and expelling slide or piston. In order to predetermine the amount of the charge at will according to the present invention, the filling hopper is arranged adjustably on the said casing.

In the drawing in which a tube-filling-machine is shown by way of example:

Figure 1 is a vertical section drawn to the line 1—1, Fig. 2,

Fig. 2 a section drawn to the line 2—2 of Fig. 1,

The casing has a cylindrical shape and consists of two stationary side frames $a$ and two intermediate cylindrical members $a^1$ and $a^2$. In the sides $a$ is journaled a shaft $b$ adapted to be driven by a suitable gearing $b^1$ and carrying a cylinder or disk $c$, which snugly fits in between the sides $a$ and the members $a^1$ and $a^2$ and which is provided with a radial slot $d$ within which a slide or piston $e$ is mounted. The piston $e$ is provided with lateral studs $f$, which project into cam grooves $g$ in the side frames $a$. The grooves $g$ have a cylindrical part $g^1$ concentric to the shaft $b$ and a second cylindrical part $g^2$ also concentric to the shaft $b$, but at a larger radius, the two concentric parts $g^1$ and $g^2$ being connected by two straight parts $g^3$. The members $a^1$ and $a^2$ are so shaped that at the lower ends they concentrically embrace the circular disk $c$, while in the upper part of the casing the members $a^1$ and $a^2$ are cut short to form a chamber $h$. The cam grooves $g$ are so shaped, that by the rotation of the disk $c$ the studs $f$ slide within the grooves causing a reciprocation of the slide $e$ in such manner that when passing the lower part of its rotation, the slide $e$ is fully retracted into its slot $d$, while in the upper part of rotation the slide $e$ projects outward into the chamber $h$, thus forcing any material which might have been filled into the chamber $h$ to one side.

Figure 1:
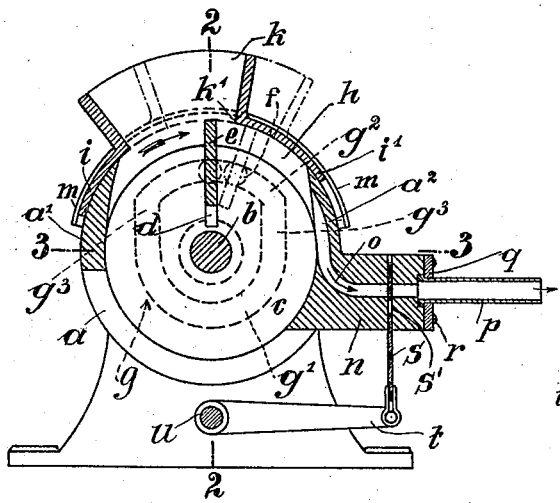
Figure 2:
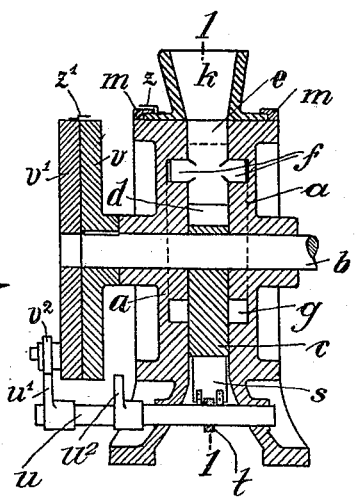
Figure 3:
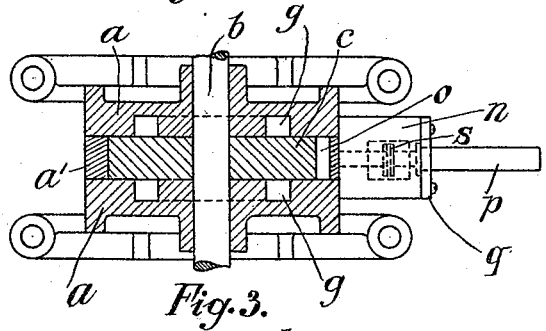
Fig. 3 is a section drawn to the line 3—3 of Fig. 1.
Figure 4:
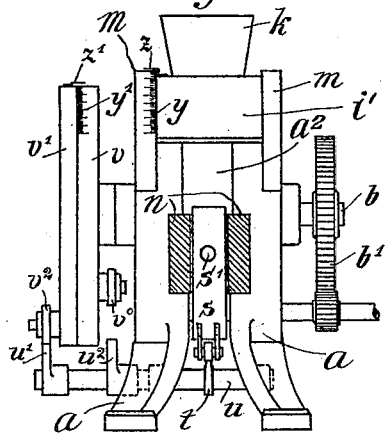
Fig. 4 is a front view of the machine, partly in section.
Figure 5:
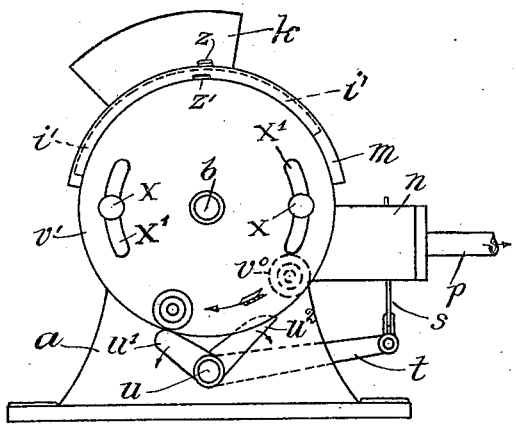
Fig. 5 is a side view.

On the casing a hopper $k$ is adjustably arranged which is provided with two tongues or plates $i$ and $i^1$ curved to the same radius as the outer surface of the side frames $a$ and held between guides $m$. Thus by adjusting the hopper $k$ the distance between the inner edge $k^1$ of the hopper $k$ and the casing member $a^2$ can be changed at will, thus predetermining the amount of material that can be caught hold of by the piston $e$, because evidently, when material is filled into the hopper, it will fill the chamber $h$, and on the forward movement of the piston $e$ in the direction indicated by the arrow, Fig. 1, part of the material will be retained in the hopper $k$ until the piston $e$ reaches the edge $k^1$, and as soon as this edge is passed the piston $e$ will compress the material within the closed part of the chamber $h$. The casing member $a^2$ has an outward projecting part $n$ and a channel $o$, which forms an outlet for the chamber $h$. In the construction shown a nozzle or tube $p$ is detachably fastened to the projection $n$ by a plate $q$ and bolts $r$. Within the projection $n$ a perforated slide $s$ is arranged to move vertically and is adapted to close the channel $o$ before the material within the chamber $h$ is compressed. The slide $s$ is rotatably attatched to an arm $t$, pivoted to the casing by a stud or shaft $u$, carrying two members $u^1$ and $u^2$. On the shaft $b$ of the disk $c$ a disk $v$ is attached, carrying a stud or anti-friction roller $v^0$, and by means of two set screws $x$, a second disk $v^1$ can be adjustably fastened to the disk $v$, slots $x^1$ within the disk $v^1$ allowing of such adjustment. The disk $v^1$ is also provided with a stud or anti-friction roller $v^2$, the member $u^1$ projecting into the path of the anti-friction roller $v^2$ and the member $u^2$ projecting into the path of the anti-friction roller $v^0$. On one side, that is to say, next to the disks $v$ and $v^1$ the casing is provided with a scale $y$, and corresponding to this scale a second scale $y^1$ is provided on the disk $v$ attached to the shaft $b$. The hopper carries an index $z$ pointing to the scale $y$, and the adjustable disk $v^1$ is also provided with an index $z^1$ pointing to the scale $y^1$ of the disk $v$. When the hopper $k$ is adjusted to such position as to determine the amount of material to be filled at every charge by the machine, the disk $v^1$ is to be adjusted to the same amount, the indices $z$ and $z^1$ being used to ascertain the proper amount to which the disk $v^1$ is to be rotated against the disk $v$.

The operation of the machine is as follows: A tube which is to be filled is slid over the nozzle $p$, and the hopper $k$ is adjusted in its position, so that the closed part of the chamber $h$ will correspond in size to the size of the tube to be filled, and before the machine is set in rotation, also the disk $v^1$ is adjusted in such manner that the index $z^1$ points to the same number on the scale $y^1$ as the index $z$ points to the corresponding number of the scale $y$. When rotating, the piston $e$ will shift the material filled into the hopper $k$ and falling into the chamber $h$ toward the casing member $a^2$, that is to say, to the discharge channel $o$. When that part of the chamber $h$ which is below the tongue $i^1$ of the hopper, is filled, no further material can enter that part on account of the fact that the slide $s$ closes the channel $o$. When the piston $e$ passes the edge $k^1$ of the hopper $k$, the disks $v^1$ and $v$ will be rotated to such an extent that the anti-friction roller $v^2$ presses against the member $u^1$, thus moving the arm $t$ and with it the slide $s$ upward to raise the opening $s^1$ of the latter into position to coincide with the channel $o$, thus opening the outlet and permitting the piston $e$ to press out the material from the chamber $h$ into the nozzle $p$ and the receptacle to be filled. When the piston $e$ has passed the inlet opening of the channel $o$, the anti-friction roller $v^0$ engages the member $u^2$, causing a downward motion of the slide $s$, and thus again shutting the outlet. During the further rotation of the piston $e$ the filled receptacle can be replaced by an empty one, and when the piston $e$ passes the upper part of its rotation, the operation described above will be repeated. By adjusting the hopper $k$ and the disk $v^1$ evidently, within certain limits, any desired predetermined amount can be filled.

I claim:

1. A filling machine for doughy and powdery material comprising a cylindrical casing, a rotatable radially movable piston, and a hopper adapted to be adjusted to predetermine the amount to be filled.

2. A filling machine for doughy and powdery material comprising a cylindrical casing, a rotatable radially movable piston, a rotatable disk having a slot, within which the piston is adapted to move radially on the rotation of the disk, and a hopper adapted to be adjusted transversely to the piston to predetermine the amount to be filled.

3. A filling machine for doughy and powdery material comprising a cylindrical casing, a rotatable radially movable plate forming a piston, a rotatable disk having a slot, within which the piston is adapted to move radially on the rotation of the disk, cam grooves in the inside walls of the casing, studs on the said piston adapted to project into the said grooves which are so shaped as to reciprocate the piston within the said slot, and a hopper adapted to be adjusted transversely to the axis of rotation of the piston to predetermine the amount to be filled.

4. A filling machine for doughy and powdery material comprising a cylindrical casing, a disk arranged rotatably within the casing in such manner that a chamber is left in the upper part of the casing, a radial slot in the disk, a plate adjustable within the slot and provided with studs projecting out laterally to the said disk, cam grooves in the side walls of the casing, into which grooves the studs of the plate project, the cam grooves being so shaped as to cause a radial movement of the plate when the disk is rotated in such manner that the plate projects out from the disk into the said chamber, a hopper adjustably arranged on the casing, by which hopper the material can be filled into the chamber, an outlet in the casing by which the material can be pressed out on the movement of the plate.

5. A filling machine for doughy and powdery material comprising a cylindrical casing, a disk arranged rotatably within the casing in such manner that a chamber is left in the upper part of the casing, a radial slot in the disk, a plate adjustable within the slot and provided with studs projecting out laterally to the said disk, cam grooves in the side walls of the casing, into which grooves the studs of the plate project, the cam grooves being so shaped as to cause a radial movement of the plate when the disk is rotated in such manner that the plate projects out from the disk into the said chamber, a hopper adjustably arranged on the casing, by which hopper the material can be filled into the chamber, an outlet in the casing by which the material can be pressed out on the movement of the plate, a slide adapted to close said outlet.

6. A filling machine for doughy and powdery material comprising a cylindrical casing, a disk arranged rotatably within the casing in such manner that a chamber is left in the upper part of the casing, a radial slot in the disk, a plate adjustable within the slot and provided with studs projecting out laterally to the said disk, cam grooves in the side walls of the casing, into which grooves the studs of the plate project, the cam grooves being so shaped as to cause a radial movement of the plate when the disk is rotated in such manner that the plate projects out from the disk into the said chamber, a hopper adjustably arranged on the casing, by which hopper the material can be filled into the chamber, an outlet in the casing by which the material can be pressed out on the movement of the plate, a slide adapted to close said outlet, means to move the said slide so as to open the outlet when the plate in its forward movement has passed the opening of the hopper, thus driving out the material fed into the said chamber by the hopper.

7. A filling machine for doughy and powdery material comprising a cylindrical casing, a disk arranged rotatably within the casing in such manner that a chamber is left in the upper part of the casing, a radial slot in the disk, a plate adjustable within the slot and provided with studs projecting out laterally to the said disk, cam grooves in side walls of the casing, into which grooves the studs of the plate project, the cam grooves being so shaped as to cause a radial movement of the plate when the disk is rotated in such manner that the plate projects out from the disk into the said chamber, a hopper adjustably arranged on. the casing, by which hopper the material can be filled into the chamber, an outlet in the casing by which the material can be pressed out on the movement of the plate, a slide adapted to close said outlet, means to move the slide operated by the rotation of the shaft carrying the said disk.

8. A filling machine for doughy and powdery material comprising a cylindrical casing, a disk arranged rotatably within the casing in such manner that a chamber is left in the upper part of the casing, a radial slot in the disk, a plate adjustable within the slot and provided with studs projecting out laterally to the said disk, cam grooves in the side walls of the casing, into which grooves the studs of the plate project, the cam grooves being so shaped as to cause a radial movement of the plate when the disk is rotated in such manner that the plate projects out from the disk into the said chamber, a hopper adjustably arranged on the casing, by which hopper the material can be filled into the chamber, an outlet in the casing by which the material can be pressed out on the movement of the plate, a slide adapted to close said outlet, a member in fixed connection with the shaft carrying the disk, and a second member in adjustable connection with the said shaft of the disk, and two oppositely disposed members in connection with the said slide and operated by said members to operate the slide.

HUGO OTTO SCHILLING.

Witnesses:
F. Cr. Max. Kaempff,
Emil Hager.